United States Patent Office 3,452,135
Patented June 24, 1969

3,452,135
ALLERGY DIAGNOSTIC SKIN TEST WITH CAR-
BAMIDE OR THIOCARBAMIDE AND LIPOPHILIC
ADJUVANTS
Endre Medveczky, Budapest, Hungary, assignor to
Medimpex Gyogyszerkullkereskedelmi Vallalat,
Budapest, Hungary, a firm
No Drawing. Filed Apr. 6, 1966, Ser. No. 540,485
Int. Cl. A61b 10/00; A61k 27/00
U.S. Cl. 424—9                              6 Claims

ABSTRACT OF THE DISCLOSURE

A process for percutaneous introduction of skin test diagnostic agents for revealing hypersensitivity, or allergy in human or animal subjects, which comprises rubbing on a small area of the skin a uniformly dispersed ointment comprising a biologically active diagnostic agent selected from bacteria, fungi, viruses, antigenic protein substances inducing allergy, or components thereof, in at least 10% by weight of carbamide or thiocarbamide or mixtures thereof, and at least 15% by weight of a lipophilic adjuvant.

---

This invention relates to the preparation of dispersions which can be used by percutaneous absorption for the diagnoses of hypersensitivities or allergies.

It is known that both inorganic and organic substances can be percutaneously introduced into human and animal organisms. Thus, e.g., Altona could produce with tetanus toxin a lethal poisoning on guinea pigs through the airtightly covered skin. Moro could develop on hypersensitive persons a TBC hypersensitivity reaction with tuberculin protein covered by a plaster or with a tuberculin solution mixed with lanoline. However, in this way amounts corresponding to at most 5 tuberulin units can be brought through the skin, that is, this method can be employed only on hypersensitive persons, chiefly on children. By this method, high molecular substances, e.g., high molecular polysaccharides cannot penetrate into the deeper layers of the skin.

The lack of a preparation of suitable effectiveness is mentioned by D. Lüdgers and H. Spies as a problem which ought to be urgently solved in the TBC diagnostics (Dtsch. Med. Wschrift 89, 1072—1964).

The object of the invention is to provide a process by the aid of which the components, of bacteria, fungi, viri and substances inducing allergy (further on: agents) can be readily introduced into human or animal tissues in satisfactory amounts.

The basis of the invention is the recognition that this aim can be attained if the agents to be introduced into the skin tissues are used together with lipophilic substances, in the presence of carbamide and/or thiocarbamide.

This recognition is very surprising because in the presence of carbamide or thiocarbamide the agent to be introduced into the skin tissues without lipophilic substances cannot penetrate into the skin in a higher amount than the agent alone or mixed only with lipophilic substances, that is, without carbamide or thiocarbamide.

The invention is a process for preparing dispersions to be percutaneously used for diagnoses, in which an agent selected from the group consisting of bacteria, fungi, viri, their components and substances inducing allergy is transformed by stirring, in the presence of water, a lipophilic substance being harmless to animal organisms, and a member selected from the group consisting of carbamide, thiocarbamide and a mixture thereof, to an essentially homogeneous dispersion at a temperature not exceeding the melting point of the carbamide.

In compliance with a preferred method of the process according to the invention, the agent selected from the group consisting of bacteria, fungi, viri, their components and substances inducing allergy, is mixed in the presence of water with a member of the group consisting of carbamide, thiocarbamide and a mixture thereof, whereafter, a lipophilic substance is added and the system is stirred until an essentially homogeneous dispersion is formed.

According to another preferred method, the agent selected from the group consisting of bacteria, fungi, viri, their components and substances enducing allergy and the lipophilic substance are separately mixed with a member selected from the group consisting of carbamide, thiocarbamide and a mixture thereof and the two mixtures are stirred until an essentially homogeneous dispersion is formed.

A further advantageous method of the process according to the invention consists in mixing the lipophilic substance with a member selected from the group consisting of carbamide, thiocarbamide and a mixture thereof, whereafter an agent selected from the group consisting of bacteria, fungi, viri, their components and substances inducing allergy is added and the system is stirred until a homogeneous dispersion is formed.

The dispersions according to the invention can be employed per se or they can be transformed to finished products by adding filling, binding, carrying, etc., agents, if desired, together with products of similar effect, in the form of disperse solutions, ointments, etc.

Substances promoting the penetration into the skin tissues, such as amyl nitrite, nitroglycerine, triethanol-amine trinitrate, esters and salts of nicotinic acid, 2-benzyl-4,5-imidazoline, can also be used as additive agents for preparing the essentially homogeneous dispersion. These substances can be added to the system at any phase of preparing the dispersion, that is, before or after mixing the agent and/or the lipophilic substance with the carbamide and/or thiocarbamide.

The water is preferably present in an amount so as to ensure the solubility of the agent when mixed with the carbamide and/or thiocarbamide. For this purpose, the water present in the active agent, such as, e.g., in the bacteria, fungi or viri when removing them from the nutrient medium, may be sufficient.

The amount of the lipophilic substance is at least 15% by weight and that of the carbamide and/or thiocarbamide is at least 10% by weight calculated on the agent selected from the group consisting of bacteria, fungi, viri, their components and substances inducing allergy.

The carbamide or thiocarbamide can be used in solid, melted or dissolved form. In the latter case, water or ethanol can be preferably used as solvent, although any solvent can be used in which the carbamide or thiocarbamide can be dissolved.

If in the process according to the invention tuberculin protein is used as agent, and the obtained dispersion is applied to a skin surface of about 3–5 cm.², proteins corresponding to 200–1500 tuberculin units (2–15 gamma) can be introduced into the skin tissues, whereby extremely strong allergic reactions can be induced.

Fats, oils, lanoline, hydrocarbons with at least 8 carbon atoms, aldehydes, ketones, organic bases containing nitrogen, fatty acids and/or their derivatives harmless to animal organisms can be preferably used as lipophilic substances.

Substances inducing allergy, such as proteins and microorganisms, can be simply diagnosed by means of the products according to the invention. On this basis, a simple method is available, e.g., in the case of tuberculosis for carrying out tests preceding BCG inoculations and generally for diagnosing TB allergy in hospitals and welfare centers.

For diagnostic purposes, an amount of 2–3 mg. of the dispersion obtained in the above-described way is rubbed by some pressing movements to a surface of about 1½–2 coins of the forearm. In the case of diagnosing tuberculosis, a specific positive reaction is indicated by lichenoid knots on the site of rubbing, accompanied by stronger or lighter erythema. In case of hypersensitive persons also vesicula appear which, however, become dry in a short time. The knots can be generally touched and seen for 7–8 days at an average or even longer.

The reaction of tuberculosis allergy can be induced by dispersions prepared from human, bovine, avian and BCG bacteria and atypical Mycobacteria or from a mixture thereof. The reactions obtained by these dispersions are specific in a high percentage; only the allergy reactions induced by bovine and BCG bacteria cannot be differentiated.

With an ointment for diagnosis of tuberculosis tests have been carried out on ill persons who were not infected with tuberculosis and on healthy persons. Moreover, tests have been carried out with persons suffering from bronchektasia, carcinoma, tumor, cysta, silicosis, lung trauma, osteomyelitis and pertheses. On persons not infected by tuberculosis no specific reaction was observed. This means that Mantoux negative persons do not give a positive reaction, that is, when using the product according to the invention for diagnostic purposes, the results are always fully reliable.

By the aid of the product according to the invention, comparative tests have been carried out in the welfare centers of Szolnok and Ujszász in Hungary with 962 school children (from 6 to 17 years), parallelly employing Mantoux tests and "Forte" tuberculine plaster. It has been stated that the product according to the invention is as reliable as he Mantoux test, while with the "Forte" plaster, depending on the age, the results are deceptive for 16–36% of the cases. The investigation of a whole school class could be carried out within 3–4 minutes, as contrasted with the Mantoux tests which lasted at least 30 minutes and the "Forte" plaster, the sticking of which required about 20 minutes.

737 school children in the age of 14 years were tested for TBC allergy with the aid of the product according to the invention, simultaneously with series examination for BCG. The results were in full agreement with the parallel Mantoux tests.

The effectiveness of the product according to the invention on the field of diagnostics for TBC reaches the strongest Mantoux degrees (dilution of $\frac{1}{100}$) which means that a single test is sufficient instead of three inoculations. As contrasted with the Mantoux test, on the one hand, it does not induce the inflammation of a hidden tuberculosis, and on the other hand, it does not cause fever or lymphangoitis, that is, the inflammation of the neighbouring glands. Moreover, it requires no injection, whereby the possibility of infection is fully excluded. In opposition to Moro's ointment which can be used, even on children, only with a high percentage of error, it can be used both on children and adults. This means that the product according to the invention can be employed for carrying out the tuberculine tests not only in hospitals and welfare centers but also for allergy tests preceding the BCG tests as well as for controlling the effectiveness of BCG inoculations. In addition to its reliability, the test with the product according to the invention can be carried out in a shorter time than the methods known hitherto, whereby it is rendered possible to carry out the serial examination of the population of a whole country, e.g., even of India.

In the case of the product according to the invention, the development in time of the reaction of allergy can be also followed, in opposition to the Mantoux tests, where this is rendered impossible by the sticking stress, and to the "Forte" plaster, where, due to the plaster, the development of the reaction cannot be followed. The test can be carried out even by the nursing staff of a hospital; consequently, the physicians are relieved from the burden of the manual work.

The product according to the invention is extremely cheap, and its use results in a considerable saving in costs both with BCG tests and other cases.

The process according to the invention is further illustrated by the aid of the following examples.

EXAMPLE 1

3 g. of semiwet killed *Streptococcus haemoylticus* bacteria are rubber in a mortar with 5 g. of carbamide until the mass becomes gelly. The obtained pulp is put into a dying oven of 105 C. fo 20 minutes, whereafter the loss of water is supplemented and the substance rubbed together with 10 g. of melted pig fat to a homogeneous dispersion. The thus-obtained dispersion is put again into a drying oven of 105° C., whereafter the loss of water is supplemented and the system stirred until cooling.

EXAMPLE 2

In a mortar 4 g. of *Mycobacterium typus humanus* freed from their lipoid content by Anderson's method are rubbed together with 4 g. of water. The mixture is left to stand for a day in a closed space, whereafter it is mixed with 48 g. of carbamide and left to stand for another day on water bath at 40° C., in a closed space. The substance is mixed with 60 g. of vaseline and 1 ml. of amyl nitrite and then warmed at 50° C. for 2 hours. Thereafter the mixture is poured into a mortar and stirred until cooling.

Thereby a finely dispersed ointment is obtained which can be excellently used for diagnosing the TBC allergy.

EXAMPLE 3

10 g. of egg protein are rubbed together with 10 g. of carbamide. The mixture is held for 3 hours on a water bath of 50° C. in a closed space.

15 g. of carbamide are rubber together with 30 g. of melted lanoline and the mixture is held for 2 hours on a water bath of 50° C.

Thereafter the two mixtures are poured into a mortar and homogenized to an ointment.

The thus-obtained ointment can be used for revealing hypersensitivity (allergy) against egg protein.

EXAMPLE 4

1 g. of semiwet *Mycobacterium avium* is rubbed together with 2 g. of thiocarbamide, and the mixture is warmed for 15 minutes on a boiling water bath. 2.5 g. of lanoline are added and the system is warmed for further 10 minutes on water bath, under reflux cooler. The obtained dispersion is left to cool while stirring, whereafter 0.4 ml. of triethanol amine trinitrate are admixed.

The obtained ointment can be used for revealing allergy against *Mycobacterium avium*.

EXAMPLE 5

160 mg. of purified tuberculine are heated together with 0.5 ml. of water and 1 g. of carbamide on a boiling water bath for 10 minutes, then 1 g. of melted lanoline are admixed. The system is heated under reflux for further 10 minutes, then 10 mg. of potassium salt of nicotinic acid are added. The mixture is left to cool while stirring.

The obtained ointment induces on the skin a reaction equivalent to about 250 tuberculine units introduced intracutaneously, that is, it is 50 times more effective than Moro's tubercline ointment, and it can be excellently used for diagnosing weak TBC allergy.

EXAMPLE 6

One proceeds as described in Example 2, but instead of 60 g. of vaseline, 50 g. of lanoline are used, in which 5 g. of *Mycobacteria typus humanus* killed with phenol are dissolved.

EXAMPLE 7

To 5 g. of half-wet Mycobacterium Minetti, 10 ml. of water and 10 g. of carbamide are admixed, whereafter the mixture is held for 15 minutes on a boiling water bath. Then 10 g. of paraffine oil are added and the mixture is warmed on water bath for further 15 minutes, then stirred in a mortar until cooling.

The obtained mass can be used for diagnosing allergy against Mycobacterium Minetti.

EXAMPLE 8

2 g. of fungi *Streptothrix actinomyces* are well rubbed in a mortar, then cooled to −20° C. and thereafter left to warm up to room temperature. The procedure is repeated three times, then the mass is subjected while cooling for 30 minutes to the effect of ultrasonic energy. Thereafter the mass is rubbed together with 2 g. of carbamide, left to hand for 30 minutes on a boiling water bath and then warmed for further 15 minutes together with 2.5 g. of lanoline while stirring.

EXAMPLE 9

The allantoin liquid of chick embryos infected with viri of influenza is evaporated in vacuo to a fifth volume, and 3 ml. of the obtained concentrate are mixed at room temperature with 5 g. of carbamide. The substance is left to stand for 2 days at room temperature, then warmed to 50° C. and rubbed together with 3 g. of melted lanoline. The mass is stirred until cooling.

I claim:

1. A process for percutaneous introduction of skin test diagnostic agents for revealing hypersensitivity or allergy in human or animal subjects which comprises rubbing on a small area of the skin a uniformly dispersed ointment comprising a biologically active diagnostic agent selected from bacteria, fungi, viruses, antigenic protein substances inducing allergy, or components thereof, in at least 10% by weight of carbamide or thiocarbamide or mixtures thereof and at least 15% by weight of a lipophilic adjuvant.

2. A process of claim 1 wherein said ointment is prepared by mixing the biologically active diagnostic agent in the presence of water, with said carbamide, thiocarbamide or mixture thereof and the lipophilic carrier, to obtain a uniform dispersion.

3. A process of claim 1 wherein the lipophilic adjuvant is selected from lanolin, pig fat, petroleum, paraffin oil, or other lipophilic fats, oils, hydrocarbons with at least 8 carbon atoms, fatty acids or mixtures thereof.

4. A process of claim 3 wherein the biologically active diagnostic agent reveals tuberculosis allergy.

5. A process of claim 3 wherein the biologically active diagnostic agent is an antigenic protein substance inducing allergy.

6. A process of claim 5 wherein the protein substance is tuberculin protein.

References Cited

UNITED STATES PATENTS

| | | | |
|---|---|---|---|
| 2,190,745 | 2/1940 | Vollmer | 128—2 |
| 2,282,754 | 5/1942 | Bickert | 167—84.5 |
| 2,342,150 | 2/1944 | Kleinicke | 252—354 |
| 2,374,187 | 4/1945 | Flett | 252—152 |
| 2,374,544 | 4/1945 | Hoyt | 252—152 |
| 2,422,866 | 6/1947 | Vollmer | 167—84.5 |
| 2,559,583 | 7/1951 | Barker | 252—152 |
| 2,559,584 | 7/1951 | Barker | 252—152 |
| 2,665,256 | 1/1954 | Barker | 252—152 |
| 2,773,835 | 12/1956 | Anderson | 252—153 |
| 2,871,193 | 1/1959 | Henkin | 252—152 |

OTHER REFERENCES

Martindale: The Extra Pharmacopeia, 24th ed., vol. I (1958), pp. 692–694, 996–1000, 1126–1128, 1195–1196, 1336–1337, 1540–1541, 1551, 1562–1566.

Hart: "Tuberculin Patch Tests In Children," Lancet 235 (6002), pp. 609–510, Sept. 10, 1938.

LEWIS GOTTS, *Primary Examiner.*

S. K. ROSE, *Assistant Examiner.*

U.S. Cl. X.R.

128—2; 424—88, 89, 91, 92, 93, 322, 358